United States Patent
Steele et al.

(10) Patent No.: US 9,321,183 B2
(45) Date of Patent: Apr. 26, 2016

(54) PIVOTING THUMB SUPPORT FOR POWER OPERATED ROTARY KNIFE

(71) Applicant: Bettcher Industries, Inc., Birmingham, OH (US)

(72) Inventors: Edward A. Steele, Rocky River, OH (US); Josiah Brinkerhoff, Cincinnati, OH (US); Tom Remm, Milford, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 63 days.

(21) Appl. No.: 13/792,424

(22) Filed: Mar. 11, 2013

(65) Prior Publication Data

US 2014/0250697 A1   Sep. 11, 2014

(51) Int. Cl.
 *B26B 25/00* (2006.01)
 *A22C 17/12* (2006.01)

(52) U.S. Cl.
 CPC ............... *B26B 25/002* (2013.01); *A22C 17/12* (2013.01)

(58) Field of Classification Search
 CPC ..... B25B 27/007; B25B 25/002; B25G 1/102
 USPC ........... 16/430, 900, 901; 38/90; 30/232–233, 30/291, 298, 398, 256, 519, 517
 See application file for complete search history.

(56) References Cited

U.S. PATENT DOCUMENTS

| | | | | |
|---|---|---|---|---|
| 2,013,696 A | * | 9/1935 | Olds | 38/90 |
| 2,024,371 A | * | 12/1935 | Knapp | 38/90 |
| 2,171,804 A | * | 9/1939 | Perez | 132/73 |
| 2,220,923 A | * | 11/1940 | Trilling | 33/578 |
| 2,336,603 A | * | 12/1943 | Foulds et al. | 137/244 |
| 2,827,657 A | | 3/1958 | Bettoher | |
| 2,865,127 A | * | 12/1958 | Finnegan | 42/69.01 |
| 2,933,968 A | * | 4/1960 | Hearne, Jr. | 84/380 R |
| 3,010,204 A | * | 11/1961 | Smith | 30/537 |
| 3,141,369 A | * | 7/1964 | Miccio | 84/387 A |
| 3,269,010 A | | 8/1966 | Bettcher | |
| 3,988,958 A | * | 11/1976 | Brunkow | 84/453 |
| 4,158,259 A | * | 6/1979 | Hansen et al. | 33/262 |
| 4,178,683 A | | 12/1979 | Bettcher | |
| 4,198,750 A | | 4/1980 | Bettcher | |

(Continued)

OTHER PUBLICATIONS

International Search Report dated Jul. 9, 2014 and Written Opinion of the International Searching Authority dated Jul. 9, 2014 for PCT International Application No. PCT/US2014/021899, filed Mar. 7, 2014. PCT International Application No. PCT/US2014/021899 corresponds to and claims priority from the present application. (10 pages).

*Primary Examiner* — Ned Landrum
*Assistant Examiner* — Fernando Ayala
(74) *Attorney, Agent, or Firm* — Tarolli, Sundheim, Covell & Tummino LLP

(57) ABSTRACT

A thumbpiece or thumb support (400) positioned between a head assembly (300) and a handle assembly (200) of a power operated rotary knife (100). The thumb support (400) includes a thumb supporting surface (454) to support a thumb of an operator's hand during operation of the power operated rotary knife (100). The thumb support (400) comprises a base portion (410) and thumb supporting portion (450) including the thumb supporting surface (454). The thumb support (400) further includes an interface assembly (480) between the thumb supporting portion (450) and the base portion (410) for relative pivotal movement between the thumb supporting portion (450) and the base portion (410).

19 Claims, 16 Drawing Sheets

(56) References Cited

U.S. PATENT DOCUMENTS

| | | | |
|---|---|---|---|
| 4,348,935 A * | 9/1982 | Bay | 84/380 R |
| 4,494,311 A | 1/1985 | McCullough | |
| 4,509,261 A | 4/1985 | Bettcher | |
| 4,637,140 A | 1/1987 | Bettcher | |
| 4,742,617 A * | 5/1988 | Gauvry | 30/232 |
| 5,230,154 A | 7/1993 | Decker et al. | |
| 5,400,511 A * | 3/1995 | Decker | 30/295 |
| 5,664,758 A * | 9/1997 | Smith | 248/688 |
| 5,761,817 A | 6/1998 | Whited et al. | |
| 5,768,947 A * | 6/1998 | Fee et al. | 74/523 |
| 6,769,184 B1 | 8/2004 | Whited | |
| 6,857,191 B2 | 2/2005 | Whited | |
| 7,241,071 B2 * | 7/2007 | Carraher et al. | 403/164 |
| 8,448,340 B2 | 5/2013 | Whited | |
| 8,756,819 B2 | 6/2014 | Whited et al. | |
| 8,806,761 B2 | 8/2014 | Whited et al. | |
| 2004/0083874 A1 | 5/2004 | Cacioppo | |
| 2006/0259019 A1 | 11/2006 | Sanchez et al. | |
| 2008/0172886 A1 * | 7/2008 | Jun | 30/232 |
| 2013/0025136 A1 | 1/2013 | Whited et al. | |
| 2014/0116183 A1 * | 5/2014 | Smith et al. | 74/490.12 |

\* cited by examiner

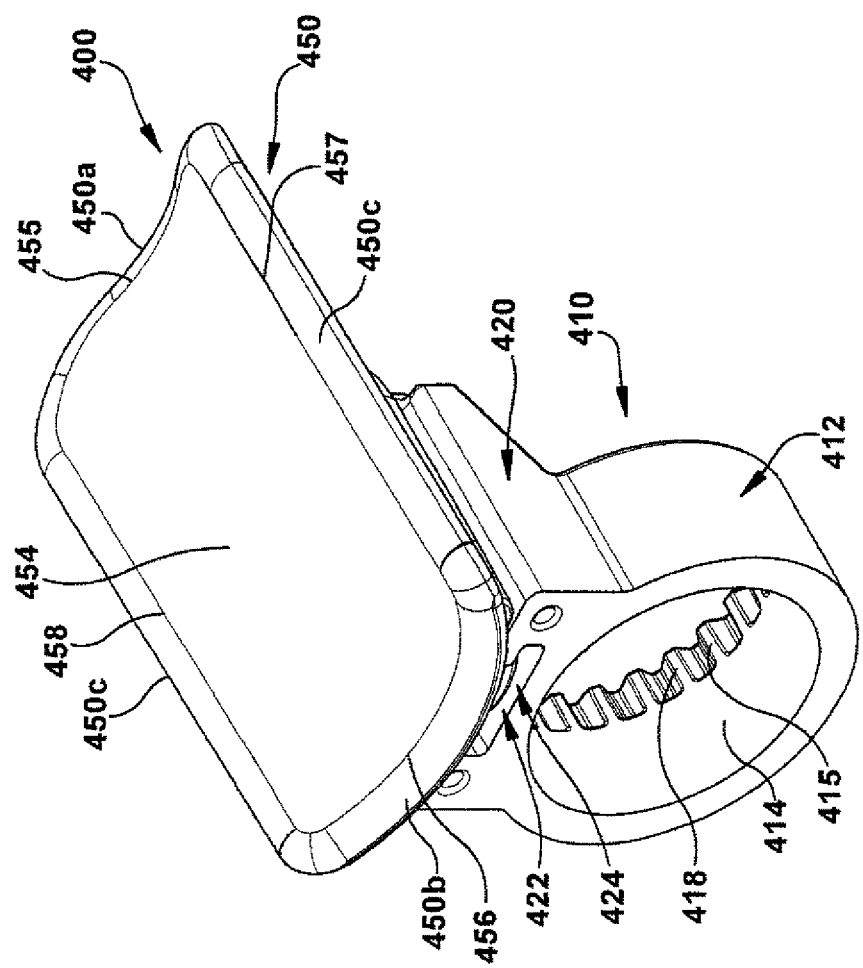

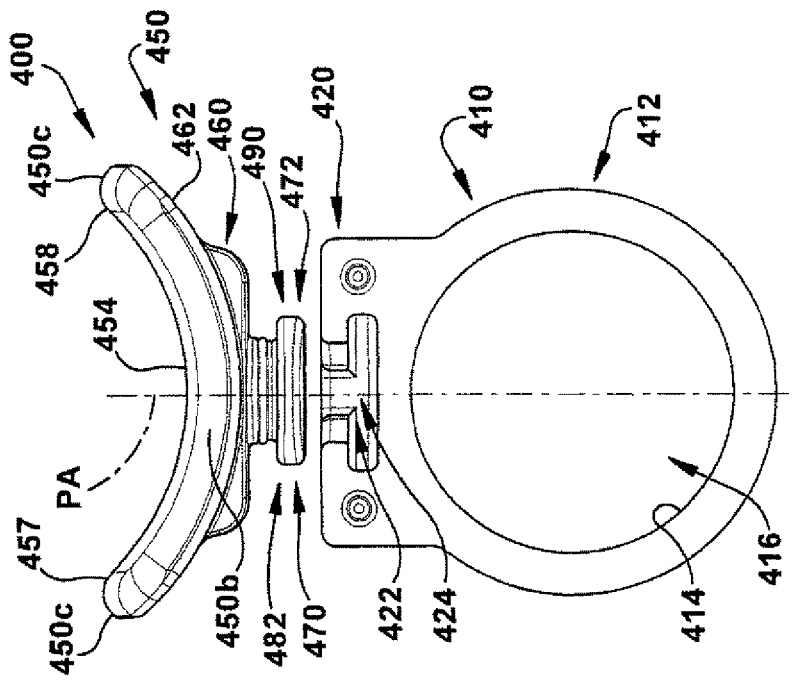
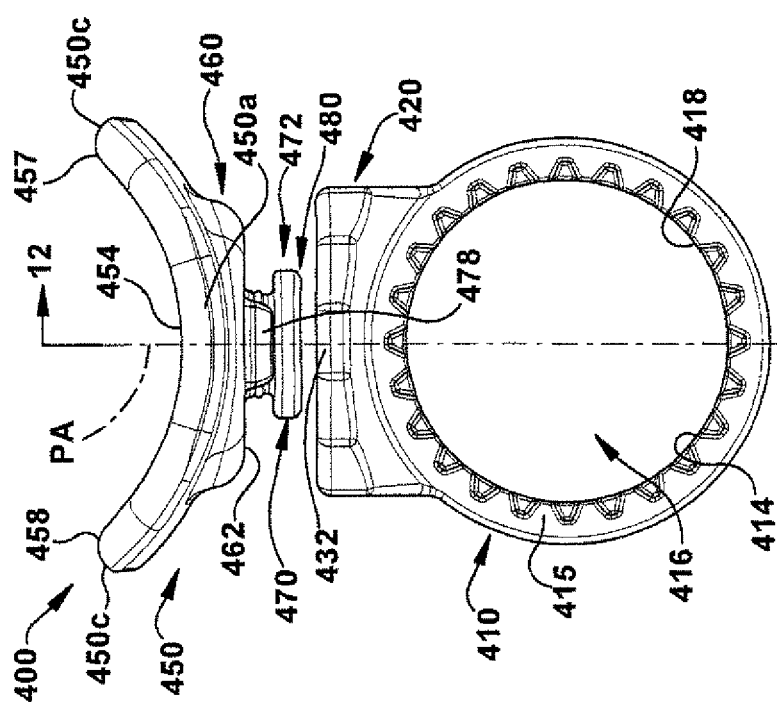

PIVOTING THUMB SUPPORT FOR POWER OPERATED ROTARY KNIFE

TECHNICAL FIELD

The present disclosure relates to a pivoting thumb support for a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy; cutting and trimming of elastomeric or urethane foam for a variety of applications including vehicle seats; and tissue removal or debriding in connection with medical/surgical procedures and/or tissue recovery from a body of a human or animal donor.

Power operated rotary knives typically include a head assembly and a handle assembly. The handle assembly includes an elongated central core and a hand piece mounted on the elongated central core. The hand piece includes a gripping surface to be grasped by an operator or user to manipulate the power operated rotary knife. The elongated central core includes a distal end attachment structure for releasably securing the handle assembly to the head assembly.

The head assembly includes a rotary knife blade, a blade housing for rotatably supporting the rotary knife blade and a frame body. At a proximal end, the frame body includes a mating attachment structure that receives the distal end attachment structure of the handle assembly to releasably secure the handle and head assemblies. At a distal end, the frame body includes a mounting pedestal for detachably mounting the blade housing. The frame body also defines a cavity to support a gear train for rotatably driving the rotary knife blade. The frame member supports the hand grip which is grasped by an operator and used to manipulate the power operated rotary knife.

In some prior rotary knives, a thumb support or thumbpiece, offset from the hand piece gripping surface, was positioned between the hand piece and the frame body to allow an operator to more easily manipulate and apply greater torque to the rotary knife. Examples of such a thumb support for a power operated rotary knife are found in U.S. Pat. No. 5,230,154 to Decker et al. and U.S. Pat. No. 5,400,511 to Decker, both assigned to the assignee of the present application. Both U.S. Pat. No. 5,230,154 to Decker et al. and U.S. Pat. No. 5,400,511 to Decker are incorporated herein in their respective entireties by reference. Such prior thumb supports included a base portion and thumb supporting portion extending at an angle from the base portion. The base portion defined a cylindrical ring that was mounted to an annular boss of the head assembly. The thumb supporting portion included a thumb contacting surface which received the operator's thumb. When the rotary knife was assembled, typically the base portion of the thumb support was sandwiched or constrained between the handle assembly and the head assembly.

Such prior thumb supports were unitary, that is, the base portion and the thumb supporting portion were fabricated of a single piece of material. As such, the thumb supporting portion was permanently fixed with respect to the base portion. Once the base portion was positioned on the annular boss of the head assembly in a specific position, the orientation of the thumb supporting portion, including the angle and location of the thumb contacting surface, was similarly fixed with respect to gripping surface of the hand piece.

Such a configuration may be problematic when right-handed and left-handed operators used the same power operated rotary knife. As used herein, a right-handed operator is an operator who grips and wields a power operated rotary knife with his or her right hand, while a left-handed operator is an operator who grips and wields the power operated rotary knife with his or her left hand. In some prior thumb supports, a thumb support for a right-handed operator would have a thumb contacting surface extending to the left (when viewed from above the power operated rotary knife) with respect to a longitudinal axis of the handle assembly, while a thumb support for a left-handed operator would have a thumb contacting surface extending to the right (when viewed from above the power operated rotary knife) with respect to the handle assembly longitudinal axis. Thus, a thumb support appropriate for a right-handed operator would not be suitable for a left-handed operator and vice versa.

Certain prior thumb supports could be rotated between different rotational positions on the annular boss of the head assembly to change the position of the thumb support from left-handed to right-handed use. However, rotating such thumb supports between different rotational positions on the annular boss required disassembly of the handle assembly from the head assembly, resulting in downtime for the power operated rotary knife and the operator.

Prior thumb supports, while useful, were lacking in certain respects, including the ability to change the position of the thumb contact surface for use by, for example, right-handed and left-handed operators or by operators who had differing hand sizes or configurations. Further, an operator using a rotary knife, may wish to change the orientation of his or her thumb with respect to gripping surface of the hand piece depending on the particular cut or trimming process being performed with the rotary knife, the amount of torque the operator wishes to apply, or to simply change the position of his or her thumb to mitigate hand fatigue. Prior thumb supports did not permit the operator to change the relative position of the thumb supporting portion with respect to the base portion so as to permit changing the orientation of the thumb supporting surface with respect to gripping surface of the hand piece. Thus, what would be needed is a thumb support for a power operated rotary knife which provides relative pivoting adjustment of the thumb supporting portion of the thumb support with respect to the base portion so as to permit changing the orientation of the thumb supporting surface with respect to the gripping surface of the hand piece without the need for disassembly of the handle and head assemblies.

SUMMARY

In one aspect, the present disclosure relates to a thumb support positioned between a head assembly and a handle assembly of a power operated rotary knife, the thumb support including a thumb supporting surface to support a thumb of an operator's hand during operation of the power operated rotary knife. The thumb support comprises a base portion, a thumb supporting portion including the thumb supporting surface, and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughbore having a central longitudinal axis, the thumb supporting portion including the thumb supporting surface and a lower interface portion, the interface assembly including a pivoting coupling between the upper interface portion of the base portion and the lower interface portion of the thumb supporting portion, a pivot axis of the pivoting coupling being transverse to and intersecting the central longitudinal axis of the cylindrical throughbore of the base portion annular ring.

In another aspect, the present disclosure related to a combination comprising a power operated rotary knife and a thumb support including a thumb supporting surface to support a thumb of an operator's hand during operation of the power operated rotary knife blade. The combination comprises the power operated rotary knife and the thumb support. The power operated rotary knife comprises a head assembly and a handle assembly, the head assembly including a frame body having an annular boss extending proximally from the frame body, the handle assembly including a hand piece having an outer gripping surface to be grasped by a user to manipulate the power operated rotary knife. The thumb support comprises a base portion, a thumb supporting portion including the thumb supporting surface, and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughbore having a central longitudinal axis, the inner peripheral surface supported on the annular boss of the head assembly frame body, the thumb supporting portion including the thumb supporting surface and a lower interface portion, the thumb supporting surface being offset from the gripping surface of the handle assembly hand piece, the interface assembly including a pivoting coupling between the upper interface portion of the base portion and the lower interface portion of the thumb supporting portion, a pivot axis of the pivoting coupling being transverse to and intersecting the central longitudinal axis of the cylindrical throughbore of the base portion annular ring.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 9 is a schematic bottom rear perspective view of the thumb support of the power operated rotary knife of FIG. 1;

FIG. 10 is a schematic rear elevation view of the thumb support of FIG. 9 in disassembled condition;

FIG. 11 is a schematic front elevation view of the thumb support of FIG. 9 in disassembled condition;

DETAILED DESCRIPTION

Figure 1:
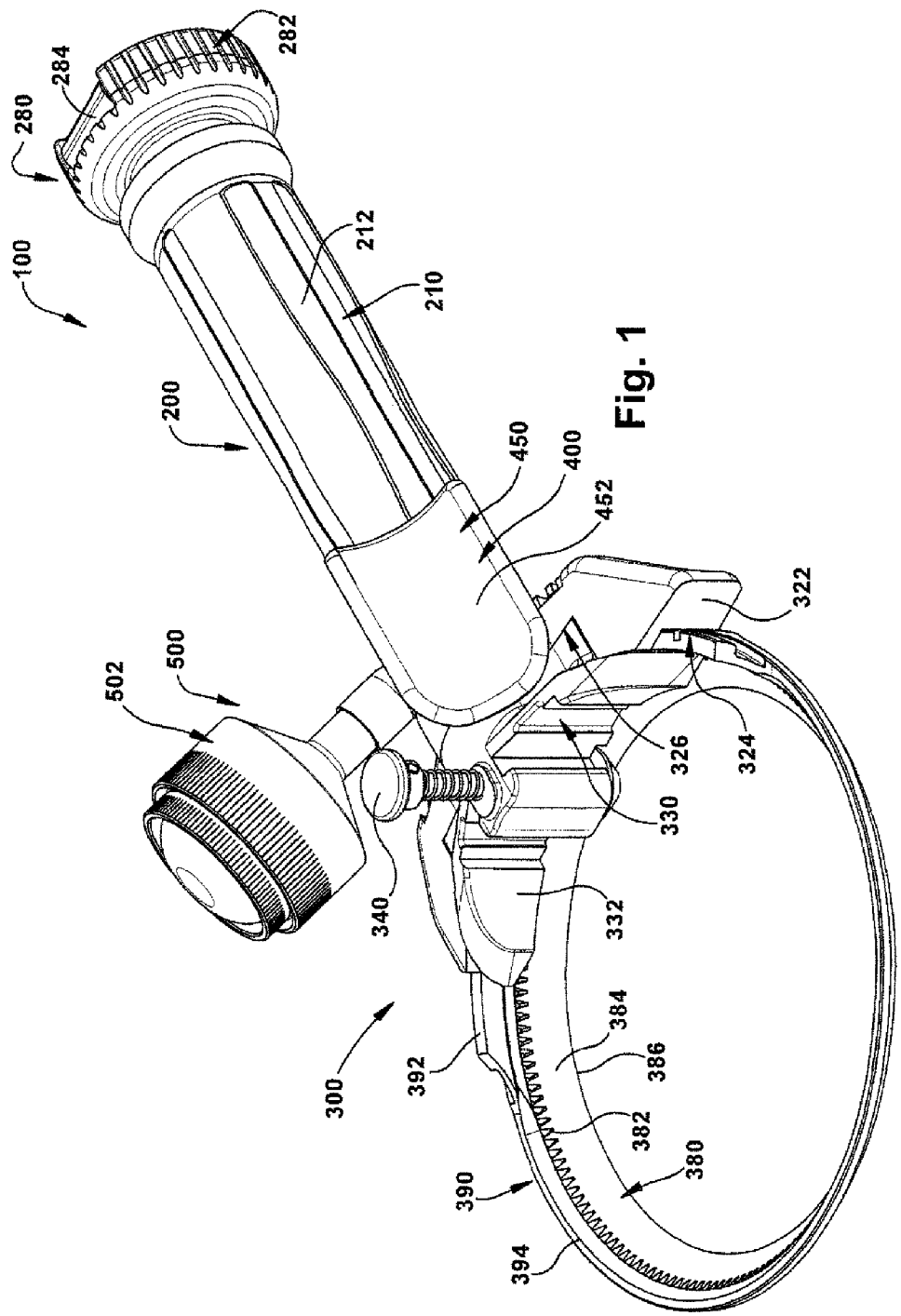
FIG. 1 is a schematic top front perspective view of a power operated rotary knife including a handle assembly, a head assembly and an pivoting thumb support of the present disclosure, wherein the pivoting thumb support is positioned on the head assembly at a rotational position suitable for a right-handed operator of the power operated rotary knife.

The present disclosure relates to a power operated rotary knife including an pivoting thumb support including a thumb support that may be advantageously pivoted with respect to a stationary base portion to provide a plurality of thumb supporting orientations, including orientations suitable for left-handed and right-handed use of the power operated rotary knife, without the need for disassembly of the power operated rotary knife.

Turning to the drawings, FIGS. 1-8 and 13-15 schematically illustrate an exemplary embodiment of a power operated rotary knife 100 of the present disclosure. The power operated rotary knife 100 includes a handle assembly 200 and a head assembly 300 releasably affixed to the handle assembly. The power operated rotary knife 100 includes a thumbpiece or thumb support 400 (best seen in FIGS. 9-12) of the present disclosure disposed between the handle assembly 200 and the head assembly 300. A grease cup assembly 500 is also disposed between the handle assembly 200 and the head assembly 300, adjacent to and in a forward direction F (FIGS. 3 and 4) from the thumb support 400.

Head Assembly 300

Figure 6:
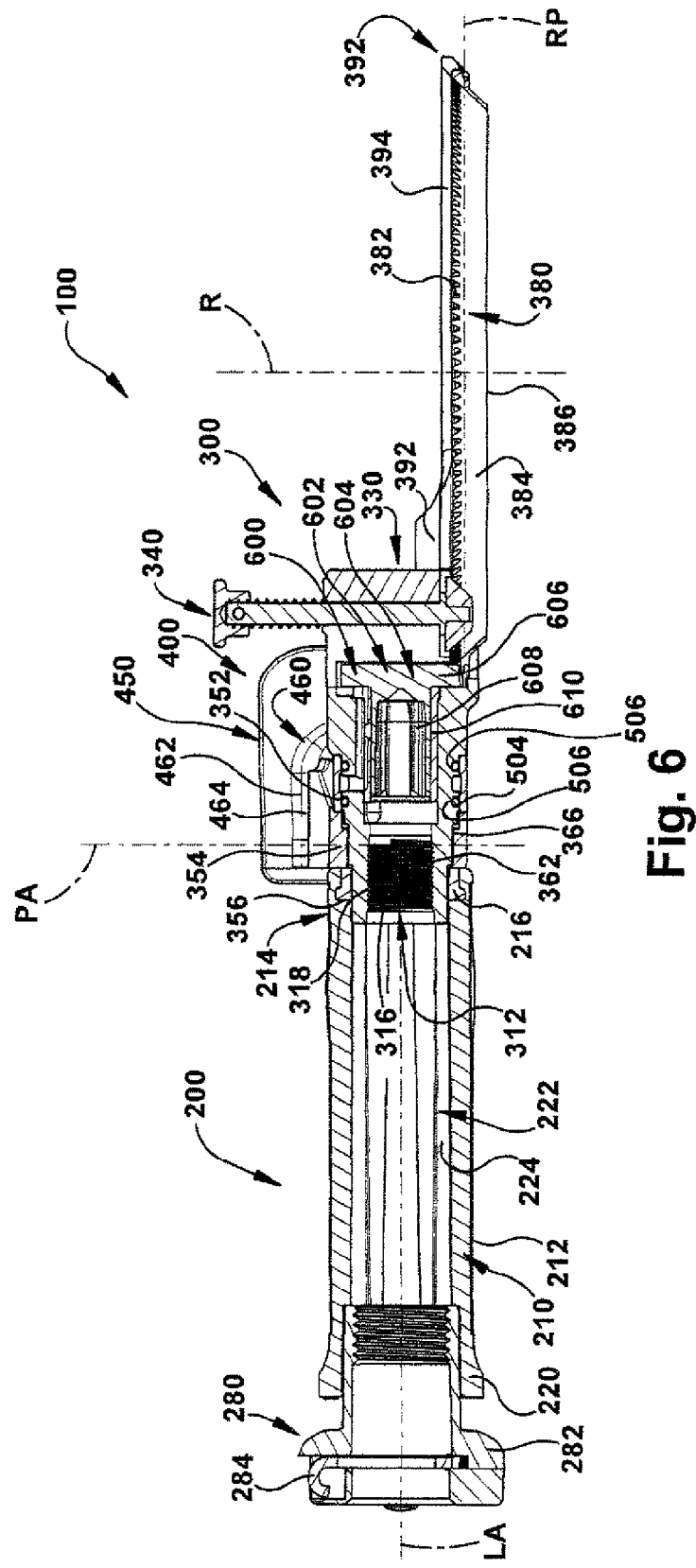
FIG. 6 is a schematic longitudinal section view of the power operated rotary knife of FIG. 1 as seen from a plane indicated by the line 6-6 in FIG. 3.
Figure 7:
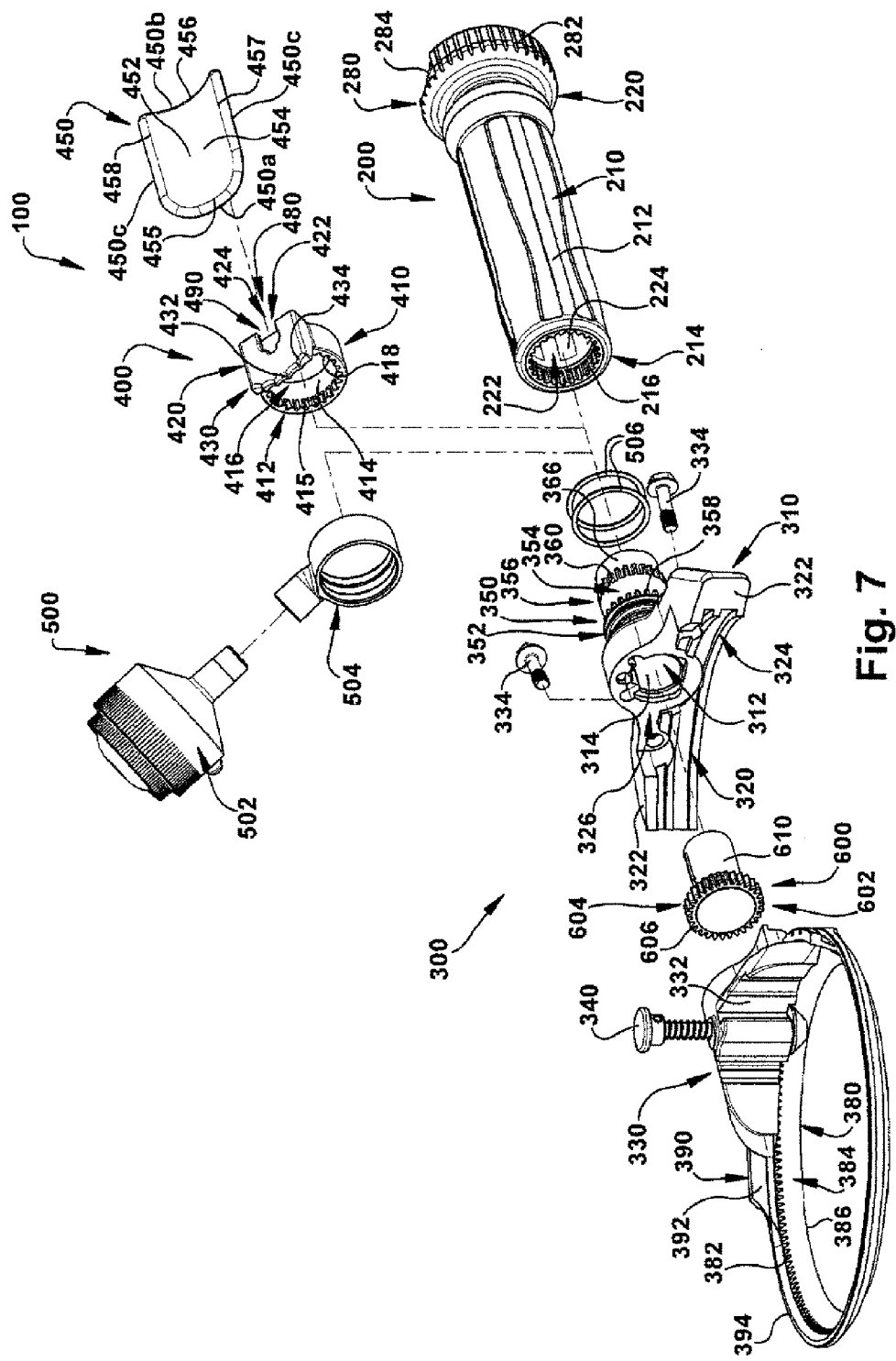
FIG. 7 is a schematic exploded front perspective view of the power operated rotary knife of FIG. 1.
Figure 8:
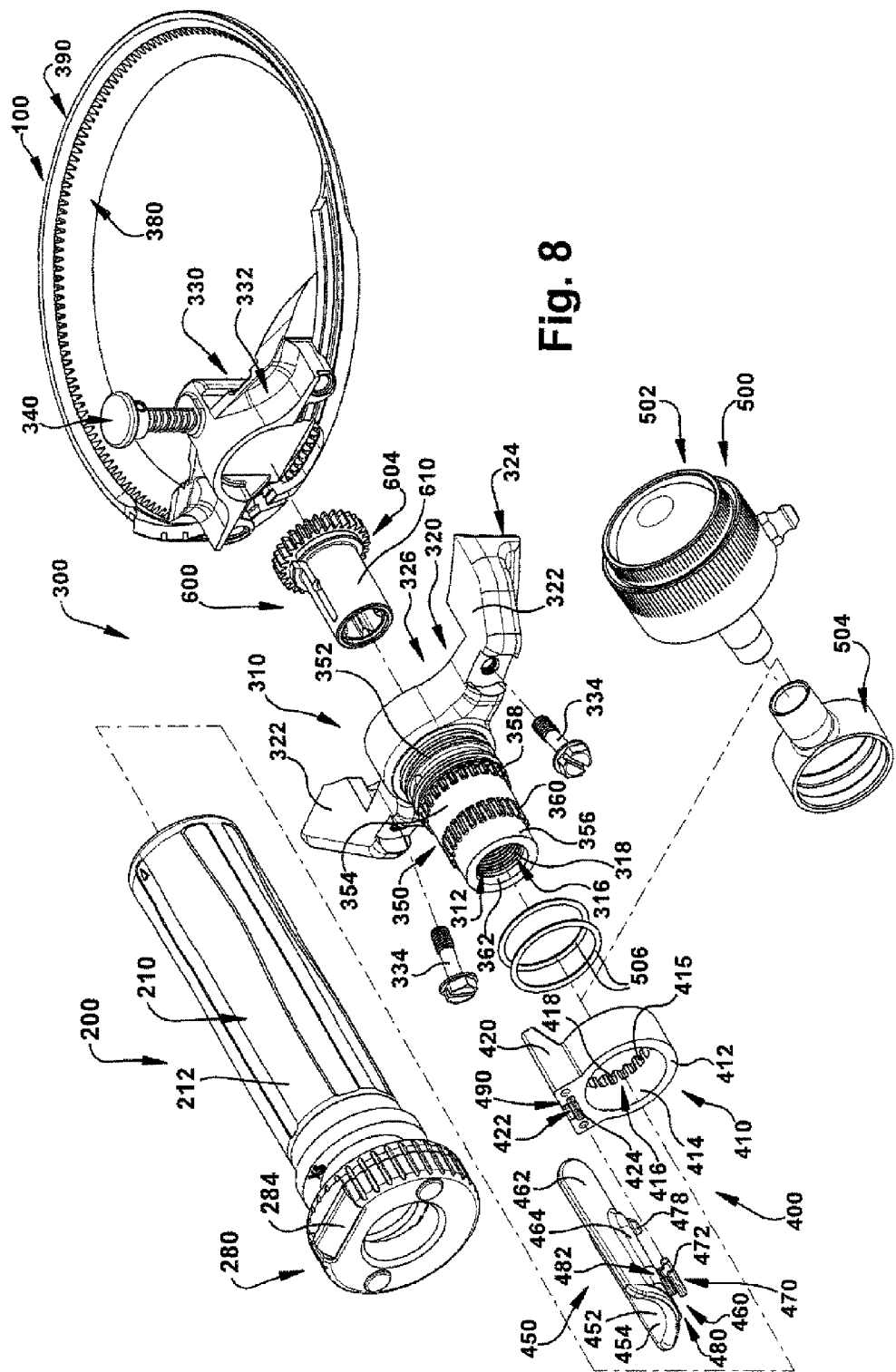
FIG. 8 is a schematic exploded rear perspective view of the power operated rotary knife of FIG. 1.

As can best be seen in FIGS. 1, 3, 7 and 8, the head assembly 300 includes a frame housing or frame body 310, a clamping assembly 330, a blade housing 390 and a rotary knife blade 380. The rotary knife blade 380 is supported for rotation about an axis of rotation R (FIGS. 2, 5 and 6) by the blade housing 390. The blade housing 390 defines a rotational plane RP (FIGS. 5 and 6) of the rotary knife blade 380. The blade housing 390, in turn, is releasably affixed to the frame body 310 by a clamp 332 of the clamp assembly 330. As is best seen in FIGS. 6-8, the frame body 310 also supports a drive mechanism 600 of the power operated rotary knife 100. In one exemplary embodiment, the frame body 310 includes a longitudinally extending, central throughbore 312 which supports a gear train 602 of the drive mechanism 600. Specifically, the gear train 602 includes a pinion gear 604 and an input shaft of the pinion gear 604 is supported for rotation within a cylindrical bushing 610 positioned within a front portion 314 of the throughbore 312. The pinion gear 604 is precisely positioned and oriented by the frame body 310 such that a gear head 606 of the pinion gear meshes with a set of gear teeth 382 of the rotary knife blade 380 to rotate the knife blade 380 within the blade housing 390.

Frame Body 310

The frame body 310 includes a forward or distal blade housing support region 320 and a rearward annular boss 350. The forward blade support region 320 includes a pair of outwardly extending arcuate arms 322 which define a blade housing mounting region 324 for receiving an arcuate mounting section 392 of the blade housing 390 and a clamping receiving region 326 for receiving the proximal wall of the clamp 332 of the clamping assembly 330. The clamp 332 is secured to the frame body 310 by a pair a threaded fasteners 334 that extend through respective openings in the arcuate arms 322 of the frame body 310. The arcuate mounting section 392 of the blade housing 390 is sandwiched between the forward blade housing support region 320 and the clamp 332 to releasably secure the blade housing 390 to the frame body 310. The clamp assembly 330 further includes a steeling assembly 340 which may be depressed by the operator during operation of the power operated rotary knife 100 for steeling the rotary knife blade 380.

In one exemplary embodiment, the rearward annular boss 350 of the frame body 310 includes an inner surface 362 defining a rear portion 316 of the central throughbore 312. The rear portion 316 of the central throughbore includes a threaded section 318. A frame tube (not shown) threads into and is permanently affixed to the threaded section 318 of the rearward annular boss 350. The frame tube (not shown) extends rearwardly though a central throughbore 222 of a hand piece 210 of the handle assembly 300 and includes a threaded proximal end section. An outer surface 366 of the rearward annular boss 350 includes three regions: a) a proximal region 352; b) a middle region 354; and c) a distal region 356. The proximal region 352 includes a pair of exterior grooves on the outer surface 366 that receives a pair of sealing members 506 of the grease cup assembly 500. The middle region 352 includes a plurality of raised splines 358 and is sized to receive an annular ring 412 of a base portion 410 of the thumb support 400.

Handle Assembly 300

As can best be seen in FIGS. 1 and 3-6, the handle assembly 200 extends along a longitudinal axis LA. The handle assembly 200 includes a hand piece 210 defining an exterior gripping surface 212 adapted to be gripped by an operator of the power operated knife 100 when wielding and manipulating the knife 100. The hand piece 210 includes the central throughbore 222 (FIG. 6) defined by an inner surface 224 of the hand piece 210. The throughbore 222 is coaxial with the longitudinal axis LA and is aligned with the frame body throughbore 312.

The handle assembly 200 further includes a drive shaft latching assembly 280. The shaft drive latching assembly 280 releasably secures a flexible shaft drive assembly (not shown) of the drive mechanism 600 to the handle assembly 200 such that motive power may be applied to rotate the pinion gear 604 within the throughbore 312 of the frame body 310 and thereby rotate the rotary knife blade 380. The shaft drive latching assembly 280 includes a latching knob 282 secured to a proximal end 220 of the hand piece 210 and a latching member 284 for releasably securing a coupling of the shaft drive assembly to the handle assembly 200.

The latching knob 282 of the drive shaft latching assembly 280 threads onto the threaded end section (not shown) of the frame tube (not shown) of the frame body 310. When the latching knob 282 is threaded onto the threaded proximal end section of the frame tube, the hand piece 210 is thereby sandwiched and secured to the rearward annular boss 350 of the frame body 310.

Rotary Knife Blade 380 and Blade Housing 390

The rotary knife blade 380 of the power operated rotary knife 100 includes the set gear teeth 382 at one axial end of the blade 380 and a blade section 384 at an opposite axial end of the blade 380. The blade section terminates at a lower end at a cutting edge 386. The blade housing 390 includes an annular blade support section 394 that support the rotary knife blade 380 for rotation about the central axis of rotation R and defines the rotational plane RP of the blade, which is substantially orthogonal to the axis of rotation R.

Drive Mechanism 600

The drive mechanism 600 of the power operated rotary knife 100 includes a gear train 602 supported within the central throughbore 312 of the frame body 310. In one exemplary embodiment, the gear train 602 includes the pinion gear 604. The input shaft 608 of the pinion gear 604 is supported for rotation by the cylindrical bushing 610 positioned within the front portion 314 of the throughbore 312. A drive coupling of a flexible shaft drive transmission (not shown) extends through the throughbore 222 of the hand piece 210 of the handle assembly and engages a female coupling 609 (FIG. 2) defined by the pinion gear input shaft 608 to rotate the pinion gear 604. The gear head 606 of the pinion gear 604 operatively engages the set of gear teeth 382 of the rotary knife blade 380 to rotate the knife blade 380 within the blade housing 390.

Thumb Support 400

One exemplary embodiment of the thumb support or thumbpiece 400 of the present disclosure includes the base portion 410 and the thumb supporting portion 450. The base portion 410 includes the annular ring 412 and an upper interface portion 420. An inner surface 414 of the annular ring 412 includes a cylindrical throughbore 416 that defines a central longitudinal axis CLA of the thumb support 400. The annular ring 412 is sized to be snugly received on the middle region 354 of the rearward annular boss 350 of the frame body 310 when the handle assembly 200 is secured to the head assembly 300. When the thumb support 400 is mounted on the rearward annular boss 350, the central longitudinal axis CLA of the thumb support cylindrical throughbore 416 is substantially coincident with the handle assembly longitudinal axis LA.

A distal portion 415 of the inner surface 414 of the annular ring 412 includes a plurality of raised splines 418. The raised splines 418 of the annular ring 412 selectively interfit with mating raised splines 358 of the middle region 354 of the rearward annular boss 350 such that a rotational position of the thumb support 400 on the rearward annular boss 350 of the frame body 310 may be changed as desired. This can be seen by comparing, for example, FIGS. 3 and 15. In FIG. 1, as viewed from above the power operated rotary knife 100, the thumb support 400 is positioned rotationally on the rearward annular boss 350 to the left of the handle assembly longitudinal axis LA. This position of the thumb supporting surface 454 would be suitable for right-handed use of the power operated rotary knife 100. By contrast, in FIG. 15, as viewed from above, the power operated rotary knife 100, the thumb support 400 is positioned rotationally on the rearward annular boss 350 to the right of the handle assembly longitudinal axis LA. This position of the thumb supporting surface 454 would be suitable for left-handed use of the power operated rotary knife 100.

In one exemplary embodiment, the upper interface portion 420 of the base portion 410 includes an opening or socket 422. The socket 422 may be, in one embodiment, for example, a keyway or keyed slot 424 that runs substantially parallel to the central longitudinal axis CLA of the throughbore 416 of the annular ring 412.

Figure 2:
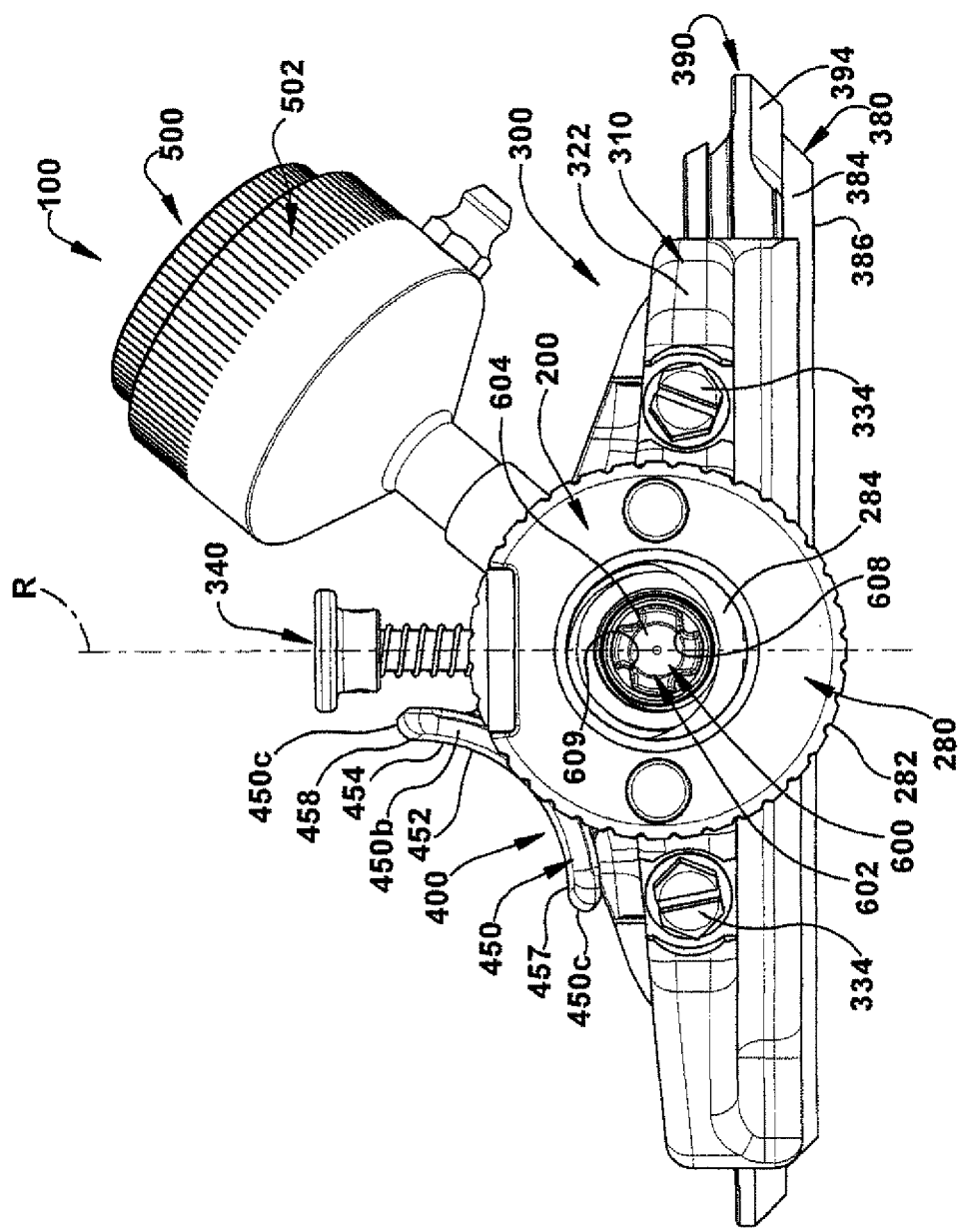
FIG. 2 is a schematic rear elevation view of the power operated rotary knife of FIG. 1.
Figure 3:
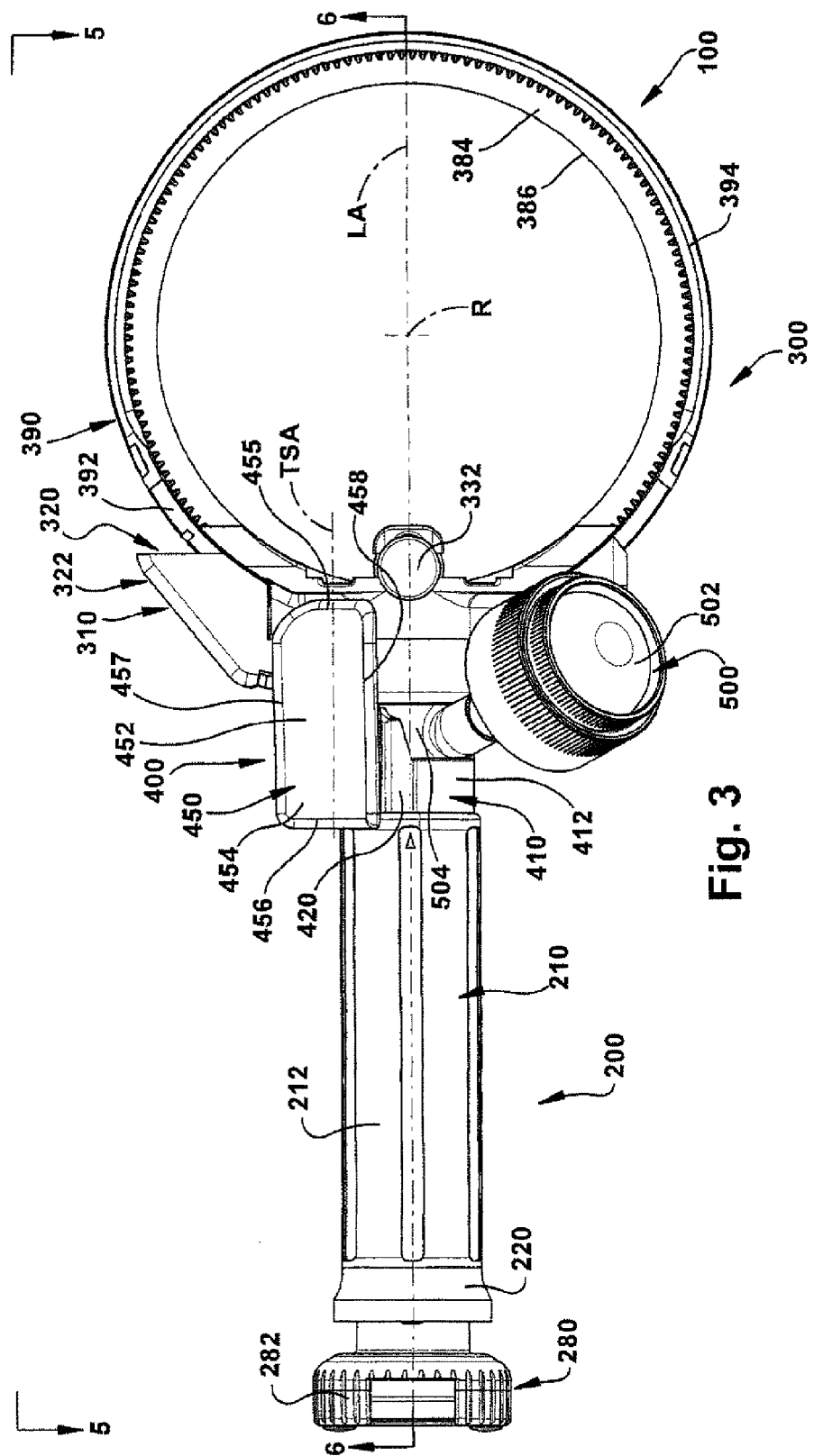
FIG. 3 is a schematic top plan view of the power operated rotary knife of FIG. 1.
Figure 4:
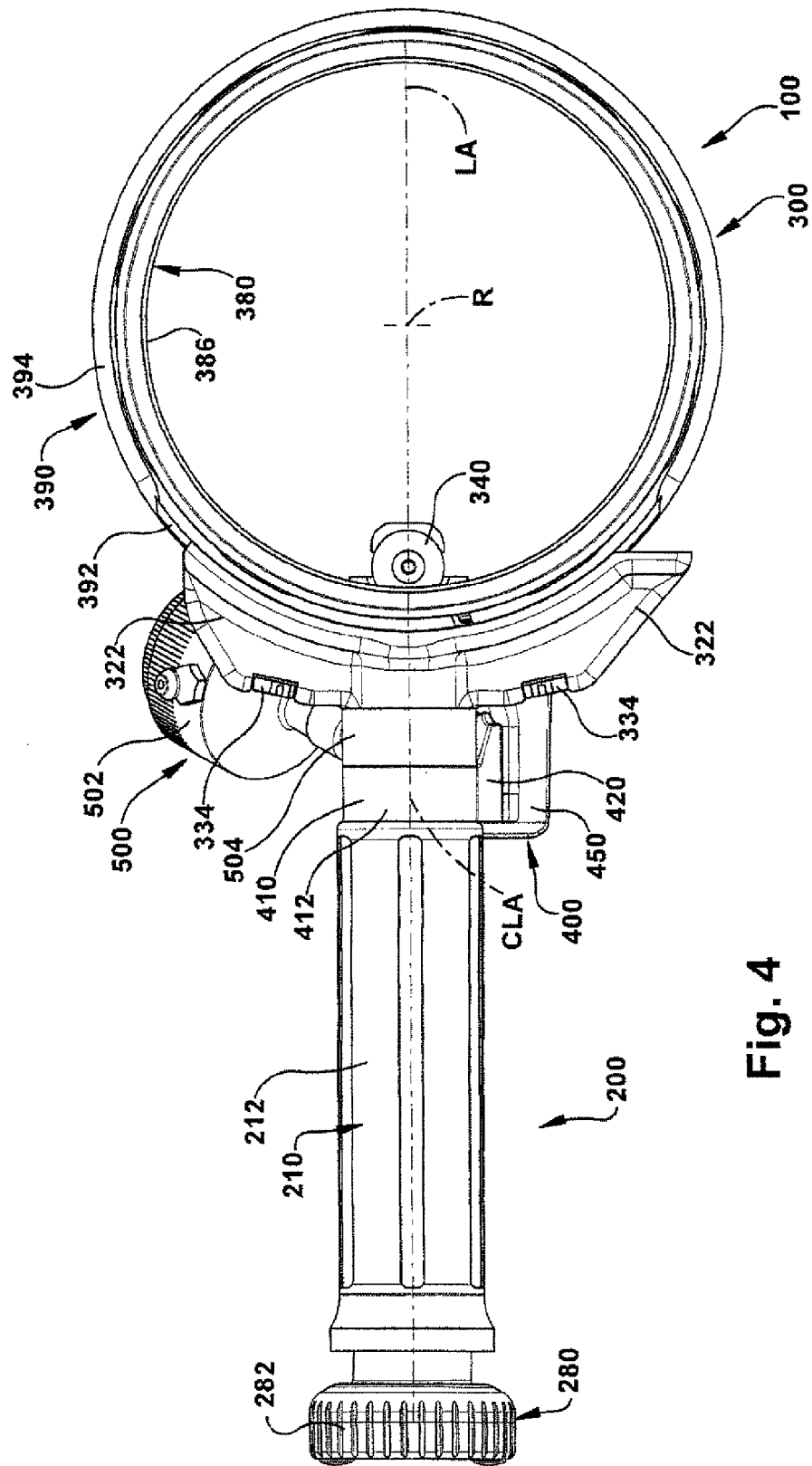
FIG. 4 is a schematic bottom plan view of the power operated rotary knife of FIG. 1.
Figure 5:
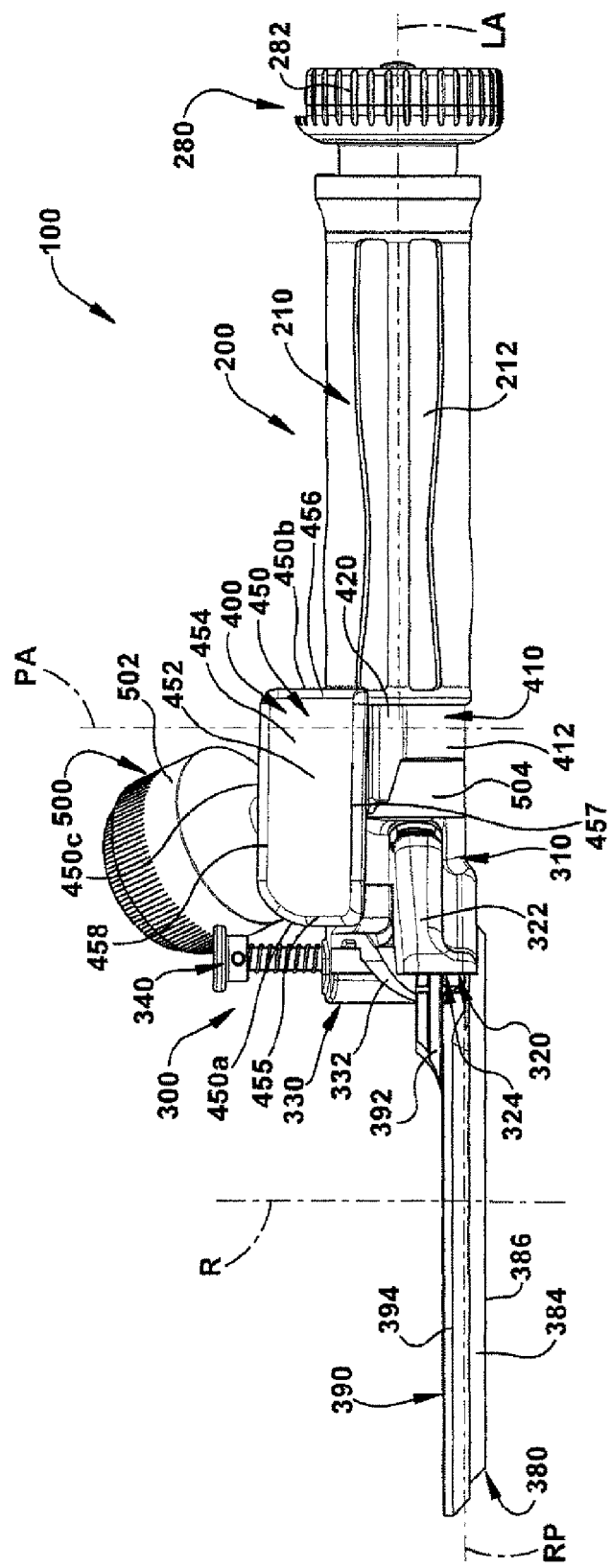
FIG. 5 is a schematic side elevation view of the power operated rotary knife of FIG. 1 as seen from a plane indicated by the line 5-5 in FIG. 3.

The thumb supporting portion 450 includes a front end 450a, a back end 450b, and opposite side walls 450c. The thumb supporting portion 450 includes an upper surface 452 defining the thumb supporting surface 454. As best can be seen in FIGS. 3 and 15-17, the thumb supporting surface 454 is concave with respect to the handle assembly longitudinal axis LA and is generally rectangular, extending between a forward edge 455 and a back edge 456 and opposing sides 457, 458. A thumb supporting axis TSA extends longitudinally and centrally between the opposing sides 457, 458. The thumb supporting axis TSA is generally along a line of action or direction of a thumb contacting surface of an operator's thumb, as the operator would position his or her thumb on the thumb supporting surface 454 of the thumb support 400 when operating the power operated rotary knife 100. As is best seen in FIGS. 2 and 3, the thumb supporting surface 454 is offset radially and generally forwardly from the gripping surface 212 of the handle assembly hand piece 210. In the orientations of the thumb supporting surface 454 shown in FIGS. 3 and 15, the thumb supporting axis TSA would be substantially parallel to the central longitudinal axis CLA of the throughbore 416 of the annular ring 412 and substantially parallel to the handle axis longitudinal axis LA.

In one exemplary embodiment, the thumb supporting portion 450 further includes a lower interface portion 460. The lower interface portion 460 includes a generally rectangular, raised pedestal 464 extending downwardly from a lower surface 462 of the lower interface portion 460. Extending downwardly from the raised pedestal 464 of the lower interface portion 460 of the thumb supporting portion 450 is a projection 470. In one exemplary embodiment, the projection 470 includes a lower keyed portion 472. The lowered keyed portion 472 of the projection 470 is slidingly received within the keyway or keyed slot 424 of the socket 422 of the upper interface portion 420 of the base portion 410. The lower keyed portion 472 is generally mushroomed-shaped when viewed in cross section and includes a post 474 extending downwardly from the raised pedestal 464 and an enlarged head 476 at the end of the post 474. The post 474 includes a radially extending skirt 475.

Figure 12:
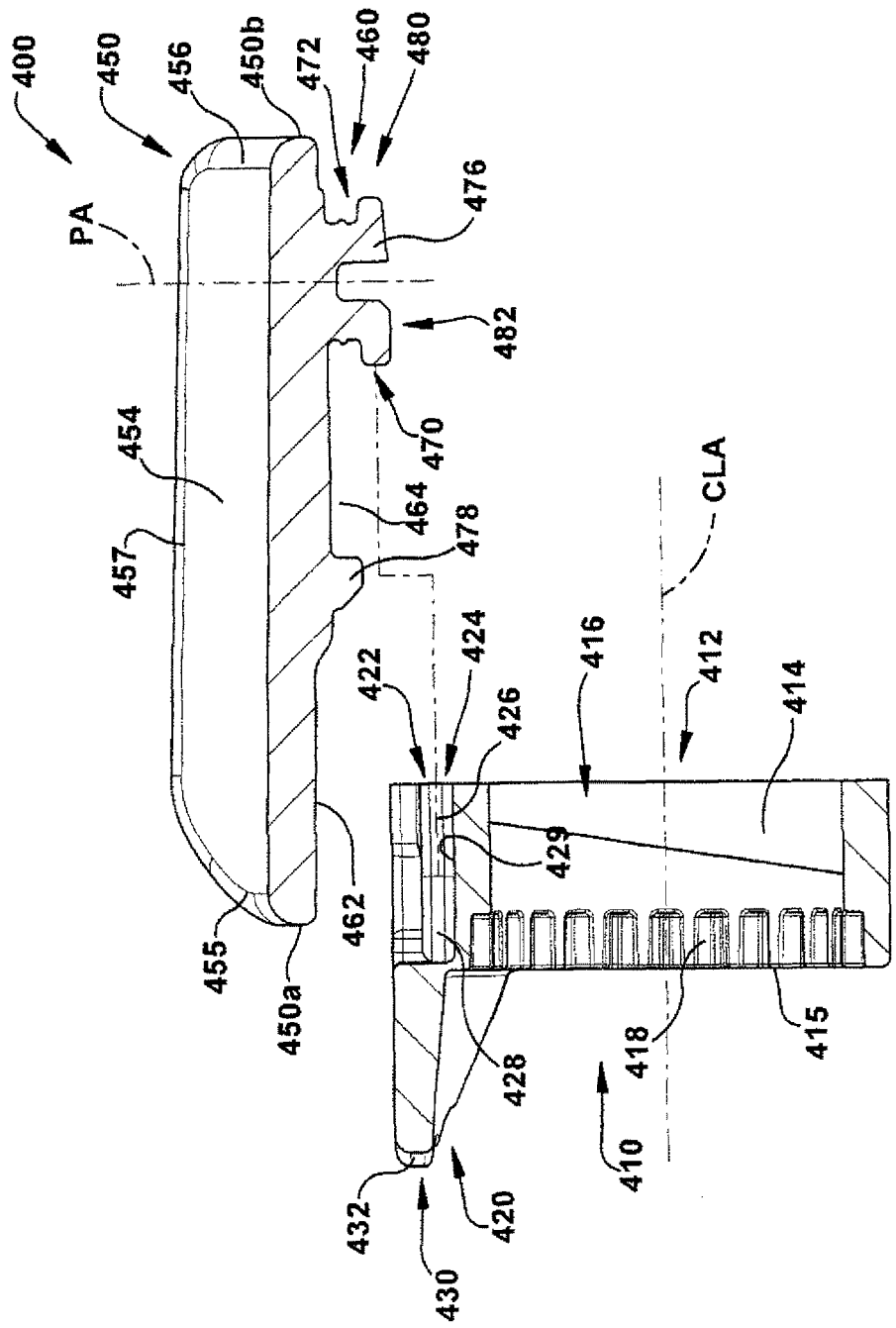
FIG. 12 is a schematic longitudinal section view of the thumb support of FIG. 9 in disassembled condition as seen from a plane indicated by line 12-12 in FIG. 10.
Figure 13:
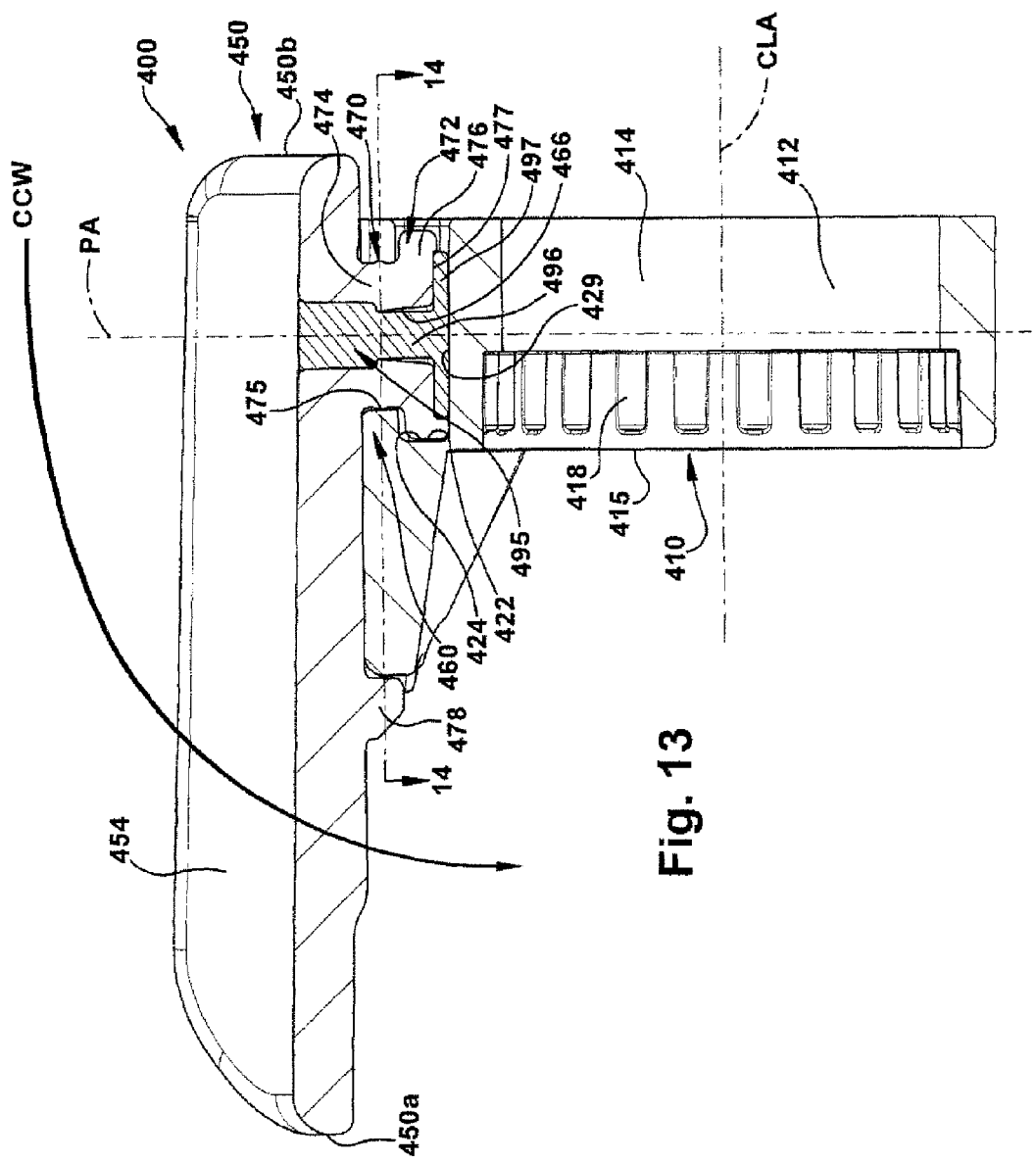
FIG. 13 is a schematic longitudinal section view of the thumb support of FIG. 9 in assembled condition, including a biasing member interposed between a base portion and a thumb supporting portion of the thumb support.
Figure 14:
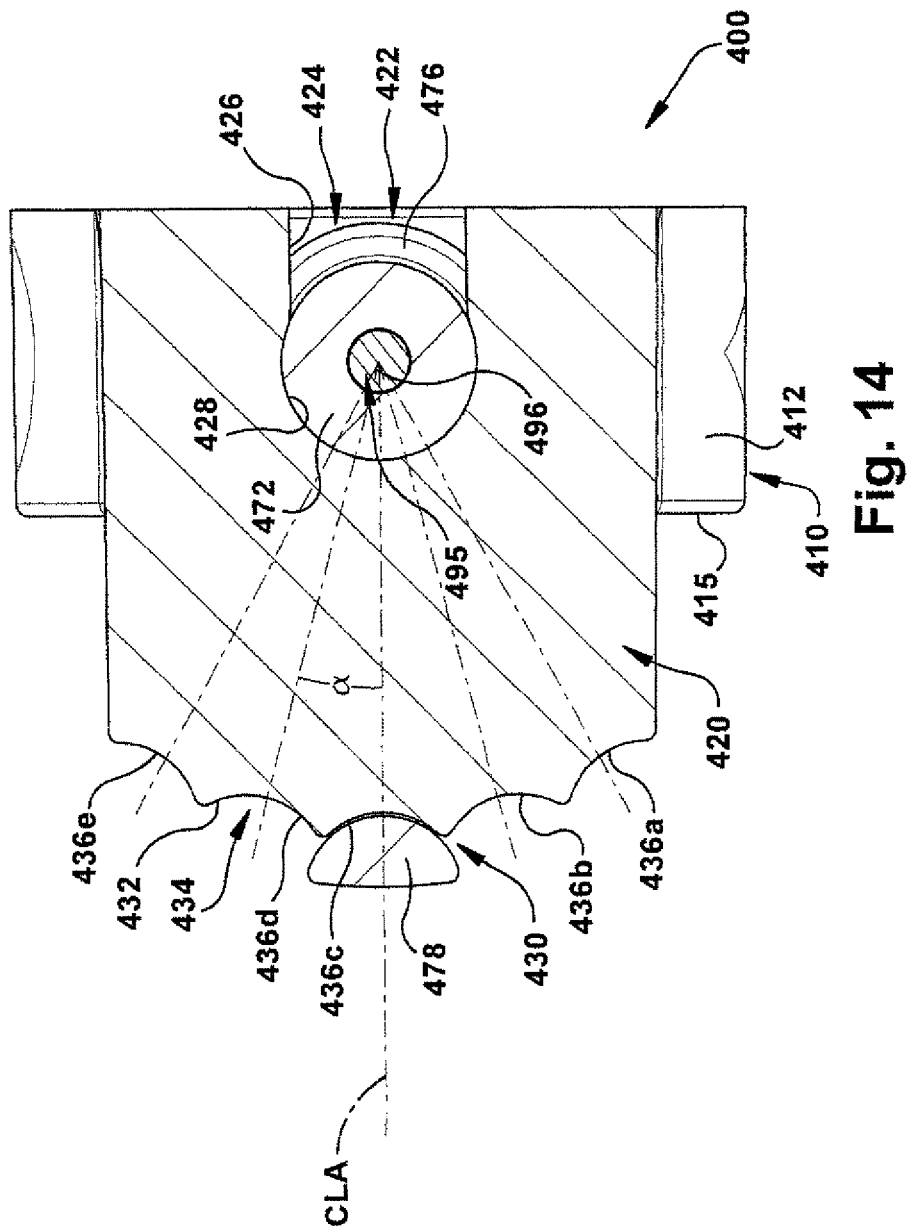
FIG. 14 is a schematic section view of the thumb support of FIG. 9 as seen from a plane indicated by the line 14-14 in FIG. 13.

As can be seen in FIGS. 13 and 14, the interfit of the keyed portion 472 of the thumb supporting portion 450 into the keyway 424 of the upper interface portion 420 of the base portion 410 mechanically couples the base portion 410 to the thumb support 400. The keyway 424 includes an entry portion 426 and a nesting portion 428 (FIG. 12). The keyed portion 472 of the thumb supporting portion 450 resides in the nesting portion 428 of the keyway 424 upon assembly of the thumb supporting portion 450 (see FIGS. 12 and 13). In one exemplary embodiment, the post 474 of the keyed portion 472 has a slight interference fit with the corresponding entry portion 426 of the keyway 424. That is, a width of the post 474 is slightly larger than a corresponding width of the entry portion 426 of the keyway 424, while the width of the nesting portion 428 of the keyway 424 is slightly larger. In this way, the interference fit between the post 474 of the keyed portion 472 and the corresponding entry portion 426 of the keyway 424 prevents the thumb supporting portion 472 from sliding or falling out of the keyway 424 of the base portion 410, while, at the same time, the larger width of the nesting portion 428 of the keyway 424 allow easy pivoting of the post 474 within the nesting portion 428 of the keyway 424.

In one exemplary embodiment and as seen in FIGS. 13 and 14, a flexible biasing member 495 is interposed between the keyed portion 472 of the projection 470 of the lower interface portion 460 of the thumb supporting portion 450 and a lower surface 429 of the keyway 424 of the base portion 410. The biasing member 495 may be, in one exemplary embodiment, an elastomeric or rubber pad which includes a stem 496 and a head 497. The head 497 of the biasing member 495 is positioned between the enlarged head 476 of the projection 470 and the lower surface 429 of the keyway 424 to stabilize and bias the thumb supporting portion 450 in a counterclockwise direction CCW, as shown in FIG. 13. The generally cylindrical stem 496 of the biasing member 495 fits into a cylindrical opening 466 of the pedestal 464 to secure the biasing member 495 in place with respect to the thumb supporting portion 450. The cylindrical opening 466 is substantially centered on the projection 470. Additionally, the skirt 475 of the post 474 urges against the biasing member 495 to mitigate movement or vibration of the biasing member 495 within the keyway 424.

Additionally and advantageously, as previously mentioned, the projection 470 is sized to rotate or pivot about a pivot axis PA within the socket 422. As can best be seen in FIG. 13, the pivot axis PA extends through and is substantially centered about the cylindrical opening 466 of the pedestal 464. In one exemplary embodiment, the pivot axis PA of the projection 470 is substantially orthogonal to and intersects the handle axis longitudinal axis LA regardless of the rotational portion of the annular ring 412 of the base portion 410 on the middle region 354 of the rearward annular boss 350. The pivot axis PA of the projection 470 is also substantially orthogonal to and intersects the central longitudinal axis CLA of the cylindrical throughbore 416. The thumb supporting portion 450 pivots about the pivot axis PA with respect to the base portion 410.

Additionally, a suitable mechanism such as a detent mechanism 430 interposed between the upper pivot arm 476 of the projection 470 permits the thumb supporting portion 450 to be moved in stepped intervals with respect to the base portion 410 about the pivot axis PA. In one exemplary embodiment, the detent mechanism 430 includes a scalloped front wall 432 defined by the upper interface portion 420 of the base portion 410. The scalloped front wall 432 defines a multi-position detent 434, which, in one embodiment, defines five detent or pivot positions of the thumb supporting portion 450. The detent mechanism 430 further includes a downwardly extending finger 478 of the thumb supporting portion 450. The finger 478, adjacent a front portion of the raised rectangular pedestal 464 of the thumb supporting portion 450 extends downwardly from the lower surface 462 and engages the multi-position detent 434. The downwardly extending finger 478 selectively locks into one of the five positions of the multi-position detent 434 to define the relative pivotal position of the thumb supporting portion 450 with respect to the base portion 410. The operator may advantageously pivot the thumb supporting portion 450 with respect to the base portion 410 to selectively move between the five positions 436a-436e of the multi-position detent 434.

The detent mechanism 30 advantageously provides for a "lift, pivot and drop to lock" action between the thumb supporting portion 450 and the base portion 410. If the operator desires to move the thumb supporting portion 450 from a locked condition in one detent position, for example, detent position 436a to a locked condition in another detent position, for example, detent position 436e (that is, a full swing of the thumb supporting portion 450 from α1 (FIG. 16) to α2 (FIG. 17)), holding the hand piece 210 of the power operated rotary knife 100 with one hand, he or she would lift or pivot upwardly the front end 450a of the thumb supporting portion 450 with the other hand thereby raising the thumb support detent finger 478 upwardly from its engagement with detent position 436a of the upper interface portion 420 of the base portion 410. Recall that the head 497 of the biasing member 495 urges against a lower surface 477 (FIG. 13) of the enlarged head 476 of the projection 470 thereby tending to rotating the thumb supporting portion 450 in the counterclockwise direction CCW (FIG. 13). The operator, after having lifted or pivoted upwardly (in a clockwise direction—as shown in FIG. 13) the front end 450a of the thumb supporting portion 450 sufficiently such that the detent finger 478 clears engagement with detent portion 436a, the operator would then pivot or rotate the thumb supporting portion 450 about the pivot axis PA such that the detent finger 478 is in vertical alignment with desired detent position 436e. After alignment of the detent finger 478 with the desired detent position 436e, the operator then drops or releases the front end 450a of the thumb supporting position 450. The biasing member 495 urges the thumb supporting portion 450 to pivot in the counterclockwise direction CCW (FIG. 13) and, thus, the detent finger 478 is pivoted into a locked condition with detent position 436e.

The detent mechanism 430 and the lower interface portion 460 of the thumb supporting portion 450, including the socket 422 defining the keyway 424, and the upper interface portion 420 of the base portion 410, including the projection 470 defining a lower keyed portion 472, comprise the interface assembly 480 of the thumb support 400. The interface assembly 480 advantageously provides for both a mechanical coupling or keyed engagement 490 and a pivoting coupling or pivot joint 482. The keyed engagement 490 is defined by mating engagement of the lower keyed portion 472 of the projection 470 and a mating keyway or keyed slot 424 of a socket 422 which serves to mechanically secure the base portion 410 and the thumb supporting portion 450. The pivot joint 482 is defined by the pivoting relationship between the projection 470 of the thumb supporting portion 450 and the socket 422 of the base portion 410. Advantageously, the detent mechanism 430 limits and increments the range of pivoting permitted between the thumb supporting portion 450 and the base portion 410.

Figure 16:
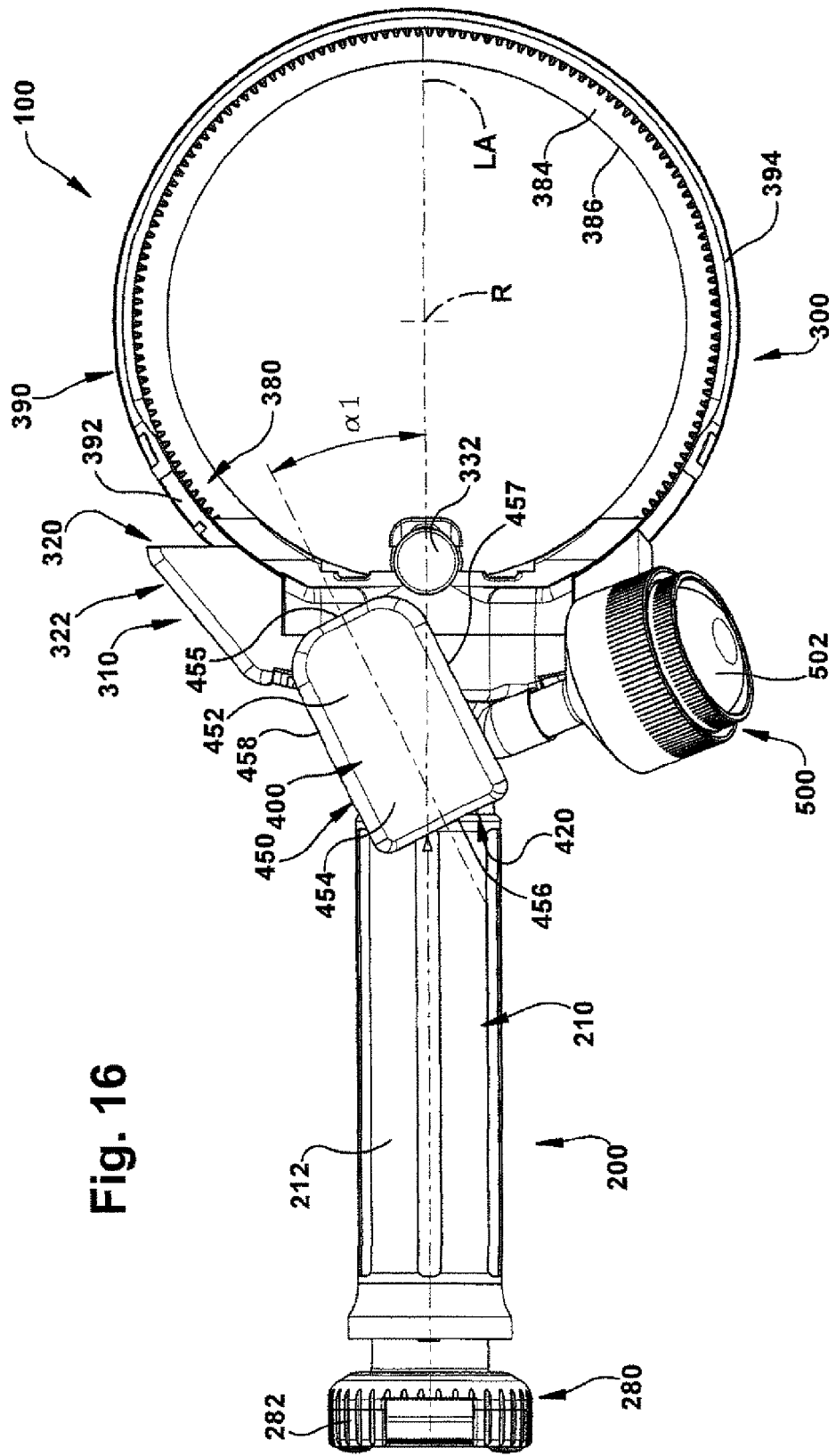
FIG. 16 is a schematic top plan perspective view of the power operated rotary knife of FIG. 1, the pivoting thumb support positioned on the head assembly at an upright rotational position, a thumb supporting portion of the thumb support pivoted to a counterclockwise position with respect to a base portion suitable for a right-handed operator of the power operated rotary knife.

Advantageously, because the thumb support 400 of the present disclosure includes the interface assembly 480 between the base portion 410 and the thumb supporting portion 450 that includes a pivoting coupling 482, the thumb supporting portion 450 may be pivoted about the pivot axis PA. This pivoting action causes the thumb support portion 450 to be pivoted, as desired by the operator, with respect to the base portion 410. This is shown, for example in FIGS. 16 and 17 wherein the thumb support 400 is rotationally positioned on the rearward annular boss 350 in an upright position. In FIG. 16, the thumb supporting portion 450 is pivoted in a counterclockwise direction. A pivot angle α (FIG. 14), as viewed from above the power operated rotary knife 100, is defined as the angle between the thumb supporting surface axis TSA and the handle axis longitudinal axis LA or alternatively, the angle between the thumb supporting surface axis TSA and the central longitudinal axis CLA (FIGS. 12-14) of the cylindrical throughbore 416 of the base portion 410.

In FIG. 16, the pivot angle is a value labeled as pivot angle α1, which would be a counterclockwise or negative angle when viewed from above. In the orientation of the thumb support 400 as shown in FIG. 16, the thumb supporting surface 454 of the thumb supporting portion 450 would be suitable, for example, for right-handed use of the power operated rotary knife 100 by an operator. In one exemplary embodiment, the pivot angle α has a maximum value of approximately 30 degrees, which each of the five detent positions 436a, 436b, 436c, 436d, 436e (FIG. 14) being spaced approximately 15 degrees apart.

Figure 17:
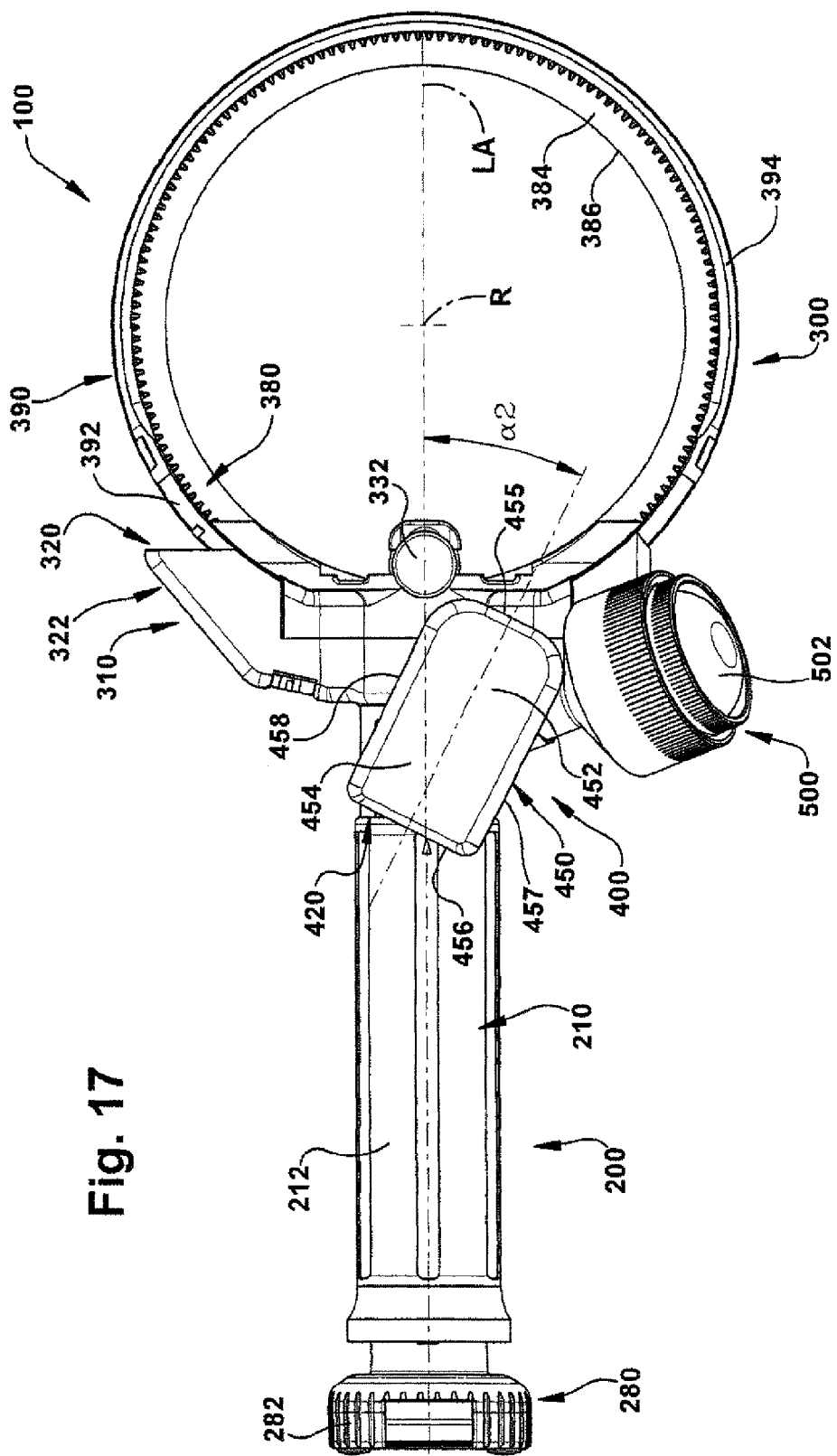
FIG. 17 is a is a schematic top plan view of the power operated rotary knife of FIG. 1, the pivoting thumb support positioned on the head assembly at an upright rotational position, the thumb supporting portion of the thumb support pivoted to a clockwise position with respect to a base portion suitable for a left-handed operator of the power operated rotary knife.

In FIG. 17, again the thumb support 400 is rotationally positioned on the rearward annular boss 350 in an upright position. The thumb supporting portion 450 is pivoted in a clockwise direction to a pivot angle α2. In such an orientation as shown in FIG. 17, the thumb supporting surface 454 of the thumb supporting portion 450 would be suitable, for example, for left-handed use of the power operated rotary knife 100 by an operator.

Figure 15:
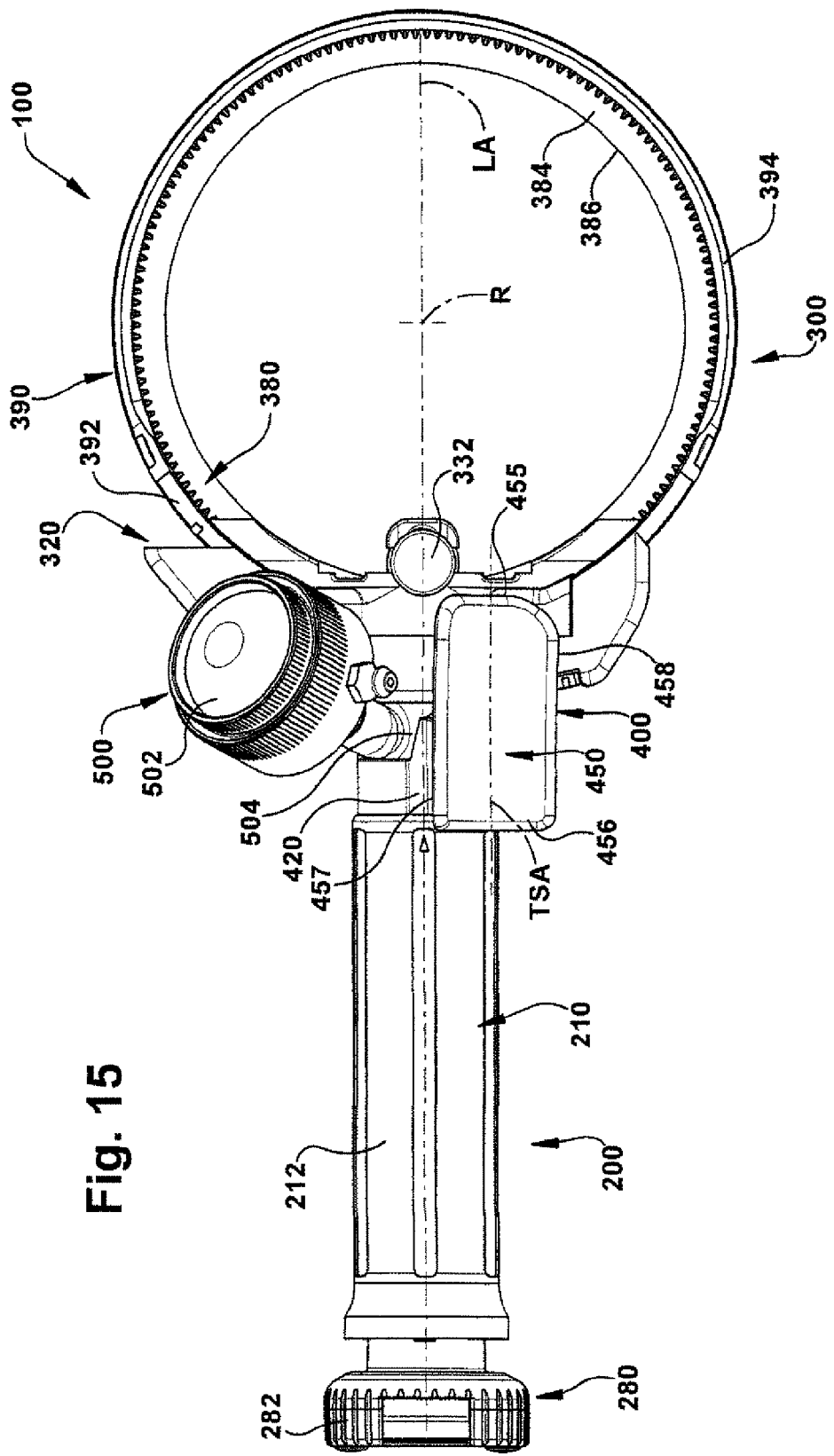
FIG. 15 is a schematic top plan view of the power operated rotary knife of FIG. 1 wherein the pivoting thumb support is positioned on the head assembly at a rotational position suitable for a left-handed operator of the power operated rotary knife.

In FIGS. 3 and 14, the pivot angle α of the thumb supporting surface 454 is zero, that is, the thumb supporting surface axis TSA and the handle assembly longitudinal axis LA is substantially zero degrees. While the orientation of the thumb supporting surface 454 may be changed from right-handed to left-handed use (as shown in FIGS. 3 and 15) by changing the rotational angle of mounting of the thumb support annular ring 412 on the middle region 354 of the rearward annular boss 350 of the frame body 310, such a rotation of the base portion 410 with regard to the annular boss 350 of the frame body 310 necessarily requires disassembly of the handle assembly 200 from the head assembly 300 and subsequent reassembly of the handle assembly 200 and the head assembly 300. Such a disassembly and reassembly operation is time consuming and represents unproductive time for both the power operated rotary knife 100 and the operator.

By advantageously utilizing the pivoting action of the thumb support 400 of the present disclosure, the power operated rotary knife 100 may quickly and easily be changed from right-handed to left-handed use (FIGS. 16 and 17) in short order. Additionally, to the extent an operator using the power operated rotary knife 100 wishes to change the orientation of his or her thumb with respect to gripping surface 212 of the hand piece 210 depending on the particular cut or trimming process being performed with the knife 100, the amount of torque the operator wishes to apply, or to simply change the position of his or her thumb to mitigate hand fatigue, this may easily and quickly be done during use of the power operated rotary knife 100 using the aforementioned "lift, pivot and drop to lock" movement of the thumb supporting portion 450, with minimal effort and downtime and no disassembly of the power operated rotary knife 100 required.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A thumb support positioned between a head assembly and a handle assembly of a power operated rotary knife, the thumb support including a thumb supporting surface to support a thumb of an operator's hand during operation of the power operated rotary knife, the thumb support comprising: a base portion; a thumb supporting portion including the thumb supporting surface; and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughhore having a central longitudinal axis, the thumb supporting portion including the thumb supporting surface and a lower interface portion, the interface assembly including a pivoting coupling between the upper interface portion of the base portion and the lower interface portion of the thumb supporting portion, a pivot axis of the pivoting coupling being transverse to and intersecting the central longitudinal axis of the cylindrical throughbore of the base portion annular ring, the upper interface portion of the base portion including a keyway extending parallel to the central longitudinal axis of the cylindrical throughbore of the annular ring and including an entry portion at one end of the keyway, and the lower interface portion of the thumb supporting portion including a keyed portion, the keyed portion of the lower interface portion of the thumb supporting portion passing through the entry portion and being slidingly received in the keyway of the upper interface portion of the base portion to couple the base portion and the thumb supporting portion.

2. The thumb support of claim 1 wherein the lower interface portion of the thumb supporting portion includes a projection defining the keyed portion, the keyed portion including a post and an enlarged head at the end of the post, the keyway of the upper interface portion of the base portion including an entry portion adjacent an end of the annular ring and a nesting portion spaced from the end of the annular ring, an interference it between the post of the keyed portion and the entry portion of the keyway maintains the keyed portion of the thumb supporting portion within the nesting portion of the keyway of the base portion.

3. The thumb support of claim 1 wherein the inner peripheral surface of the base portion annular ring includes a plurality of splines at a distal end of the annular ring.

4. The thumb support of claim 1 wherein the thumb support includes a detent mechanism comprising a detent finger of the thumb supporting portion and a multi position detent of the base portion, the multi position detent including a plurality of detent positions, the detent finger being received in a selected one of the plurality of detent positions to determine a pivot angle of the thumb supporting portion, with respect to the base portion.

5. The thumb support of claim 4 wherein a projection extends from the lower interface portion of the thumb supporting portion and a biasing member is disposed in the nesting portion of the keyway of the upper interface portion of the base portion, the biasing member including a stem extending into an opening of the projection to secure the biasing member with respect to the thumb supporting portion and a head disposed between the projection and the keyway urging against the projection to bias the detent finger of the thumb supporting portion into engagement with the selected one of the plurality of detent positions of the base portion.

6. A combination of a power operated rotary knife and a thumb support including a thumb supporting surface to support a thumb of an operator's hand during operation of the power operated rotary knife blade, the combination comprising: the power operated rotary knife and the thumb support, the power operated rotary knife comprising a head assembly and a handle assembly, the head assembly including a frame body having an annular boss extending proximally from the frame body, the handle assembly including a hand piece having an outer gripping surface to be grasped by as user to manipulate the power operated rotary knife, the thumb support comprising a base portion, a thumb supporting portion including the thumb supporting surface, and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughbore having a central longitudinal axis, the inner peripheral surface supported on the annular boss of the head assembly frame body, the thumb supporting portion including the thumb supporting surface and a lower interface portion, the thumb supporting surface being offset from the gripping surface of the handle assembly hand piece, the interface assembly including a pivoting coupling between the upper interface portion of the base portion and the lower interface portion of the thumb supporting portion, a pivot axis of the pivoting coupling being transverse to and intersecting the central longitudinal axis of the cylindrical throughbore of the base portion annular, the upper interface portion of the base potion including a keyway extending parallel to the central longitudinal axis of the cylindrical throughbore of the annular ring and including an entry portion at one end of the keyway, and the lower interface portion of the thumb supporting portion including a keyed portion, the keyed portion of the lower interface portion of the thumb supporting portion passing through the entry portion and being slidingly received in the keyway of the upper interlace portion of the base portion to couple the base portion and the thumb supporting portion.

7. The combination of claim 6 wherein the lower interface portion of the thumb supporting portion includes a projection defining the keyed portion, the keyed portion including a post and an enlarged head at the end of the post, the keyway of the upper interface portion of the base portion including an entry portion adjacent an end of the annular ring and a nesting portion spaced from the end of the annular ring, an interference fit between the post of the keyed portion and the entry portion of the keyway maintains the keyed portion of the thumb supporting portion within the nesting portion of the keyway of the base portion.

8. The combination of claim 6 wherein the inner peripheral surface of the base portion annular ring of the thumb support includes a plurality of splines at a distal end of the annular ring.

9. The combination of claim 6 wherein the thumb support includes a detent mechanism comprising a detent finger of the thumb supporting portion and a multi position detent of the base portion, the multi position detent including a plurality of detent positions, the detent finger being received in a selected one of the plurality of detent positions to determine a pivot angle of the thumb supporting portion with respect to the base portion.

10. The combination of claim 9 wherein projection extends from the lower interface portion of the thumb supporting portion and, a biasing member is disposed in the nesting portion of the keyway of the upper interface portion of the base portion, the biasing member including a stem extending into an opening of the projection to secure the biasing member with respect to the thumb supporting portion and a head disposed between the projection and the keyway urging against the projection to bias the detent finger of the thumb supporting portion into engagement with the selected one of the plurality of detent positions of the base portion.

11. A thumb support for a power operated rotary knife, the thumb support including a thumb supporting surface to support a thumb of an operator's hand during operation of the power operated rotary knife; the thumb support comprising: a base portion; a thumb supporting portion including the thumb supporting surface; and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughbore having a central longitudinal axis, the thumb supporting portion including the thumb supporting surface and a lower interface portion, the interface assembly including a pivoting coupling between the upper interface portion of the base portion and the lower interface portion of the thumb supporting portion, a pivot axis of the pivoting coupling being transverse to the central longitudinal axis of the cylindrical throughbore of the base portion annular ring, one of the upper interface portion of the base portion and the lower interface portion of the thumb supporting portion including a keyway extending, parallel to the central longitudinal axis of the cylindrical throughbore of the annular ring and including an entry portion at one end of the keyway, and the other of the upper interface portion of the base portion and the lower interface portion of the thumb supporting portion including as keyed portion, the keyed portion passing through the entry portion and being slidingly received in the keyway to couple, the base portion and the thumb supporting portion.

12. The thumb support of claim 11 wherein the upper interface portion of the base portion includes the keyway extending parallel to the central longitudinal axis of the cylindrical throughbore of the annular ring and the lower interface portion of the thumb supporting portion includes the keyed portion, the keyed portion of the lower interface portion of the thumb supporting portion being sliding received in the keyway of the upper interface portion of the base portion to couple the base portion and the thumb supporting portion.

13. The thumb support of claim 12 wherein the lower interface portion of the thumb supporting portion includes a projection defining the keyed portion, the keyed portion including a post and an enlarged head at the end of the post, the keyway of the upper interface portion of the base portion including an entry portion adjacent an end of the annular ring and a nesting portion spaced from the end of the annular ring, an interference fit between the post of the keyed portion and the entry portion of the keyway maintains the keyed portion of the thumb supporting portion within, the nesting portion of the keyway of the base portion.

14. The thumb support of claim 13 wherein the keyed portion of the thumb supporting portion rotates about the pivot axis within the nesting portion of the keyway of the base portion thereby providing the pivoting coupling between the upper interface portion of the base portion and the lower interface portion of the thumb supporting portion.

15. The thumb support of claim 2 wherein the keyed portion of the thumb supporting portion rotates about the pivot axis within the nesting portion of the keyway of the base portion thereby providing the pivoting coupling between the upper interface portion of the base portion and the lower interface portion of the thumb supporting portion.

16. A combination of a power operated rotary knife and a thumb support including a thumb supporting surface to support a thumb of an operator's hand during operation of the power operated rotary knife blade, the combination comprising: the power operated rotary knife and the thumb support, the power operated rotary knife comprising a head assembly and a handle assembly, the head assembly including a frame body having an annular boss extending proximally from the frame body, the handle assembly including a hand piece having an outer gripping surface to be grasped b a user to manipulate the power operated rotary knife, the thumb support comprising a base portion, a thumb supporting portion including the thumb supporting surface, and an interface assembly between the thumb supporting portion and base portion for relative pivotal movement between the thumb supporting portion and the base portion, the base portion including an annular ring and an upper interface portion, the annular ring including an inner peripheral surface defining a cylindrical throughbore having a central longitudinal axis, the inner peripheral surface supported on the annular boss of the head assembly frame body, the thumb supporting portion including the thumb supporting surface and a lower interface portion, the thumb supporting surface being offset from the gripping surface of the handle assembly hand piece, the interface assembly including a pivoting coupling between the upper interface portion of the base portion and the lower interface portion of the thumb supporting portion, a pivot axis of the pivoting coupling being transverse to the central longitudinal axis of the cylindrical throughhore of the base portion annular, one of the upper interface portion of the base portion and the lower interface portion of the thumb supporting portion including a keyway extending parallel to the central longitudinal axis of the cylindrical throughbore of the annular ring and including an entry portion at one end of the keyway, and the other of the upper interface portion of the base portion and the lower interface portion of the thumb supporting portion including a keyed portion, the keyed portion passing through the entry portion and being slidingly received in the keyway to couple the base portion and the thumb supporting portion.

17. The combination of claim 16 wherein the upper interface portion of the base portion includes the keyway extending parallel to the central longitudinal axis of the cylindrical throughbore of the annular ring and the lower interface portion of the thumb supporting portion includes the keyed portion, the keyed portion of the lower interface portion of the thumb supporting portion being sliding received in the keyway of the upper interface portion of the base portion to couple the base portion and the thumb supporting portion.

18. The combination of claim 17 wherein the lower interface portion of the thumb supporting portion includes a projection defining the keyed portion, the keyed portion including a post and an enlarged head at the end of the post, the keyway of the upper interface portion of the base portion including an entry portion adjacent an end of the annular ring and a nesting portion spaced from the end of the annular ring, an interference fit between the post of the keyed portion and the entry portion of the keyway maintains the keyed portion of the thumb supporting portion within the nesting portion of the keyway of the base portion.

19. The combination of claim 18 wherein the keyed portion of the thumb supporting portion rotates about the pivot axis within the nesting portion of the keyway of the base portion thereby providing the pivoting coupling between the upper interface portion of the base portion and the lower interface portion of the thumb supporting portion.

\* \* \* \* \*